Patented July 13, 1937

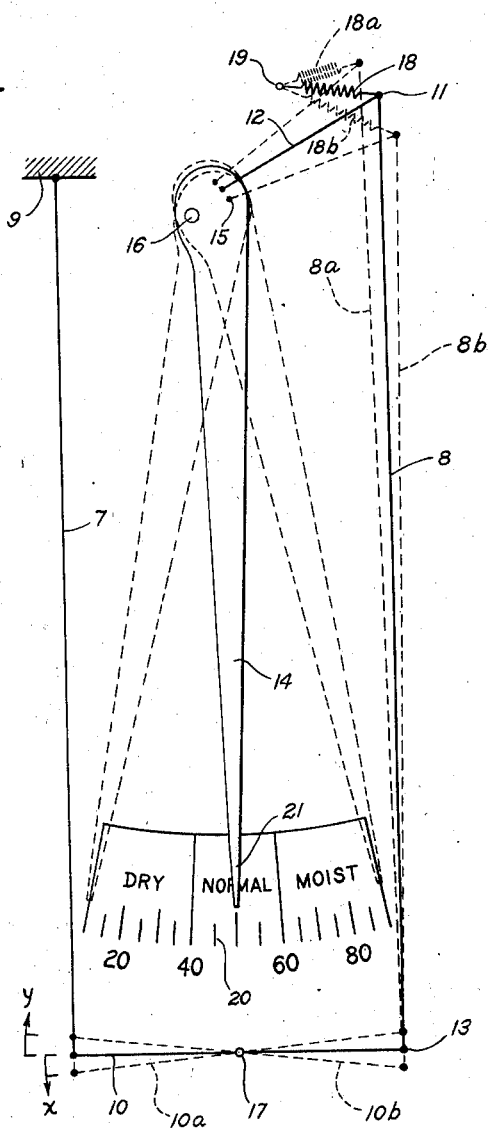

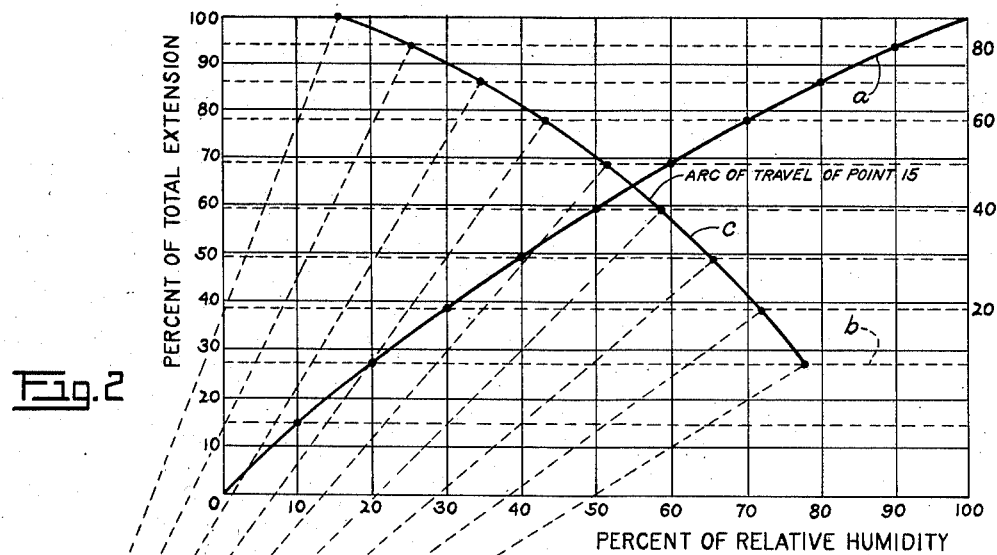
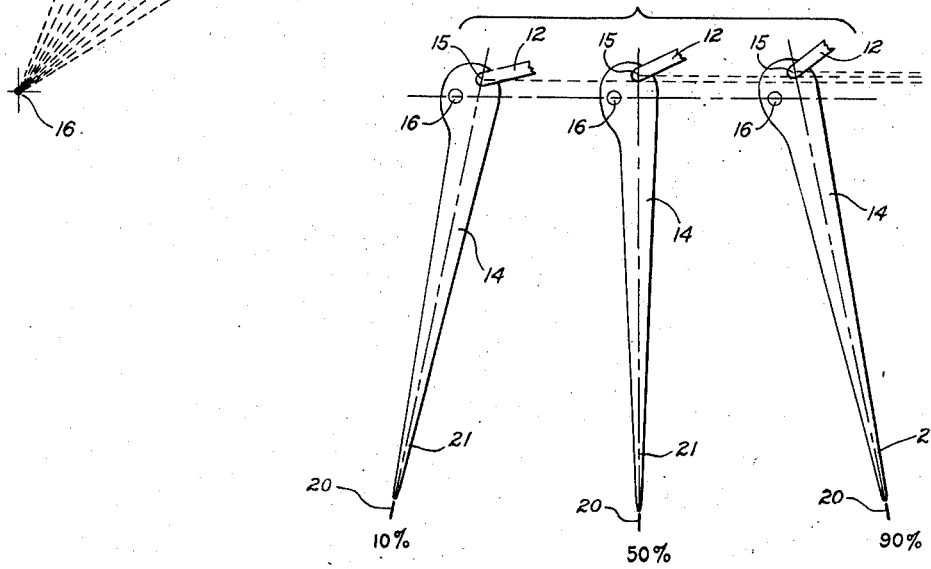

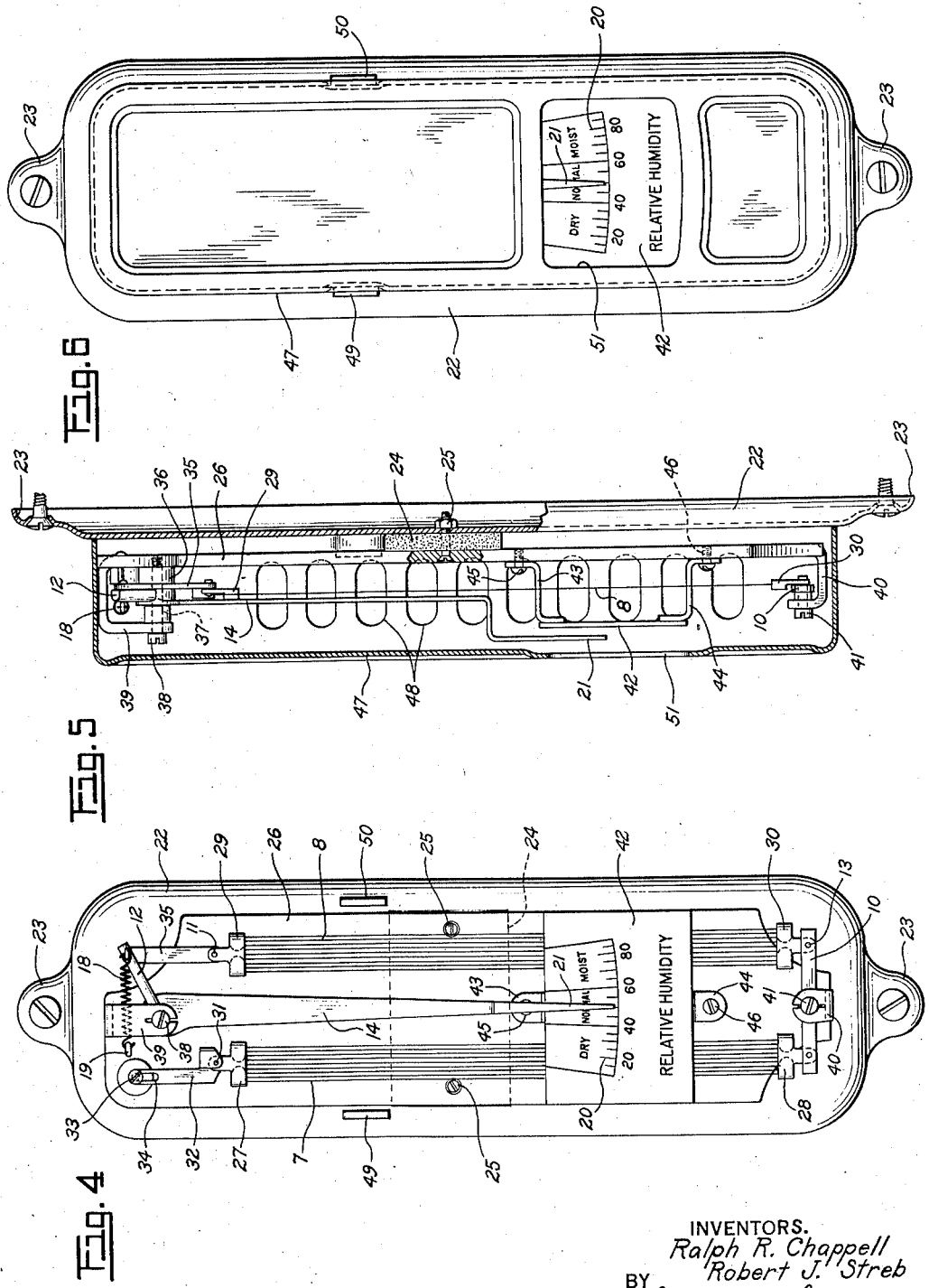

2,086,853

UNITED STATES PATENT OFFICE 2,086,853

RELATIVE HUMIDITY INDICATOR

Ralph R. Chappell, Richmond, Va., and Robert J. Streb, Baltimore, Md., assignors to Bendix Aviation Corporation, South Bend, Ind., a corporation of Delaware Application September 18, 1934, Serial No. 744,592

3 Claims. (Cl. 73—24)

The present invention relates to indicating instruments and more particularly to instruments of the hygroscopic type for indicating per cent of relative humidity.

In relative humidity indicating instruments it has been found that human hairs are the most sensitive and accurate and, therefore, the most suitable for use as the hygroscopic or humidity responsive elements thereof.

It is well-known, however, that the elongation of a strand of hair per unit length per per cent change in relative humidity decreases with increasing values of relative humidity. This is clearly shown in the U. S. Patent to Wilhelm Klinkerfues, No. 275,220, dated April 3, 1883. For this reason, when an indicating scale was employed which was proportional to the elongations of the hair, such a scale was greatly compressed in the upper ranges of relative humidity thereby rendering it difficult to read the scale in said upper ranges, and the Klinkerfues patent remedied this defect by providing a structure whereby the unequal increments of expansion and contraction of the human hair are translated into equal increments of movement of a pointer so that an equally divided scale could be utilized.

One of the objects of the present invention is to provide in a device of the class described, a novel structure including two hygroscopic elements such, for example, as two sets of human hairs connected together in a novel manner to operate an indicating means such as a pointer over a scale whereby the action of said hairs on the pointer is cumulative and is, therefore, greatly increased and whereby unequal increments of expansion and contraction of both hygroscopic elements is transformed into equal increments of the pointer so that an equally divided scale can still be utilized.

Another object is to provide a novel structure embodying two hygroscopic elements, and means connecting them together whereby their action on an indicating means is cumulative.

A further object is to provide a relative humidity indicating instrument embodying a novel structure which is rugged and compact and yet extremely sensitive and suitable for either industrial or domestic use.

The above and other objects and advantages of the invention will appear more fully hereinafter from a consideration of the detailed description which follows when taken in connection with the accompanying drawings wherein one embodiment of the invention is illustrated. It is to be expressly understood, however, that the drawings are for the purposes of illustration and description only and are not designed as a definition of the limits of the invention, reference being had to the appended claims for the latter purpose.

In the drawings wherein like reference characters refer to like parts throughout the several views:

Fig. 1 is a diagrammatic illustration of a simple form of the invention showing the manner of operation;

Fig. 2 is an enlarged graph showing the relation of the positions of the pointer and its actuating mechanism to the elongation or extension of the hygroscopic elements for various percentages of relative humidity;

Fig. 3 shows diagrammatically three positions of the pointer and its operating means for settings of 10%, 50% and 90% of relative humidity;

Fig. 4 is a front elevation, with the cover removed, of one practical form of indicating instrument embodying the invention;

Fig. 5 is a side view, partly in section, of the instrument shown in Fig. 4 and having a cover secured thereto; and Fig. 6 is another front view of the instrument with the cover attached showing the scale and pointer through said cover so that only the essential indicating elements are observed.

The function of the device embodying the present invention is to indicate in per cent the relative humidity of the air within a desired space or area such as in a room or building. The instrument embodies a hygroscopic element in the form of two substantially parallel sets of human hairs connected together and to an indicating means for cumulative action on said means in a manner to be later described, and which expand and contract as the moisture content of the air varies. The expansion and contraction of the hygroscopic element or elements is multiplied by suitable means such, for example, as a lever mechanism, to provide sufficient action to actuate an indicating means as, for example, a pointer over a scale, and in such a manner that unequal increments of expansion and contraction of the hygroscopic elements is changed into equal increments of change of indications in the indicating means whereby the latter may then be provided with an equally divided scale, thus permitting the use of a smaller scale.

Referring to the drawings, and more particularly to the diagrammatic illustration of Fig. 1, the instrument comprises, as shown, two substantially parallel sets 7 and 8 of strands of human hairs. One of the sets of hairs, for example the set 7, is pivotally secured at one end to a fixed support 9 and at the other end to an equalizing bar 10, and the other set 8 is pivotally secured at one end, as indicated at 11, to an actuating lever 12 and at the other end to the opposite end of the equalizing bar 10, as shown at 13. The lever 12 is connected to an arm 14, as shown at 15, which is eccentrically pivoted at 16 on a relatively fixed support which may be the same as that to which the set of hairs 7 is pivoted, the lever 12 thus constituting a crank for moving the arm 14 about the pivot 16 in a manner and for a purpose which will appear more fully hereinafter.

The equalizing bar 10 is pivoted intermediate its ends at 17 and preferably on the same fixed support as that on which the arm 14 and the set of hairs 7 are pivoted. A spring 18 is provided for actuating the lever 12 on expansion and contraction of the sets of human hairs 7 and 8, i. e., the spring 18 is placed under tension when the human hairs contract and then when the latter expand, the spring 18 pulls the lever 12 back, thus operating the arm 14. For this purpose, one end of the spring 18 is connected to the lever 12 at the pivotal connection 11 and its other end is connected to a fixed support, as shown at 19.

The purpose of the equalizing bar 10 is to make the expansion and contraction of the sets of human hairs 7 and 8 cumulative. This will be apparent by referring to Fig. 1. For example, if the set of hairs 7 expands an amount $x$, the bar 10 will assume the position indicated in dotted lines at 10a, thereby causing an upward movement of its end 13 and, hence, of the end 11 of the set of hairs 8 due to the pull of the spring 18. There is thus produced an angular movement of the lever 12 and, hence, of the arm 14 about its pivot 16. The hairs 8, however, will also be elongated the same amount as the hairs 7, thereby causing a further movement of the end 11 due to the pull of spring 18 to cause an increase in the movement of the lever 12 and, hence, of the arm 14 about its pivot 16. Due to the rocking movement of the equalizing bar 10, the set of hairs 8 and the spring 18 will take the respective positions shown at 8a and 18a, respectively. On the other hand, if the set of hairs 7 contracts an amount $y$, the equalizing bar 10, the set of hairs 8 and spring 18 will take the positions shown in dotted lines at 10b, 8b and 18b, respectively.

The location of the connection 15 of the lever 12 to the arm 14 and of the pivot 16 is so selected that when the lever 12 moves vertically in unequal increments due to the unequal expansion and contraction of the sets of hairs 7 and 8 for equal increments of change of relative humidity, the arm 14 will move about its pivot 16 in equal increments corresponding to the equal increments of change of relative humidity, thereby making it possible to have an equally divided scale 20 with which the arm 14 is made to cooperate as a pointer by providing a pointed extension 21 on said arm 14. The scale 20 and pointer 21 constitute the indicating means previously referred to.

The positions of the point 15 and pivot 16 may be determined, for example, as shown in Fig. 2 by first drawing on a chart a graph or curve showing the per cent of the total extension or elongation of the human hairs for the various percentages of relative humidity from 0% to 100% saturation, from data obtained by experiment. This produces the curve indicated as $a$ on the chart. Then the horizontal lines $b$ are drawn parallel to the "per cent-relative humidity" axis at the point where the curve $a$ intersects the vertical or ordinate lines. An arc $c$ is then drawn across the chart, by trial, until it is found that the distances along said arc from one point to the next, at which said arc intersects with the dotted horizontal lines, are equal. When the position of the arc $c$ is found, the center from which the arc was drawn will determine the position of the pivot 16, and the radius of the arc will determine the distance at which the point 15 must be from the pivot 16, the arc $c$ being the path of the point 15 for the various percentages of relative humidity. Therefore, although the point 15 moves in a vertical direction through unequal distances corresponding to the unequal increments of the elongation of the human hairs, the arm 14 will move through equal angular increments corresponding to the equal angles subtended by the equal portions of the arc $c$. Thus, it will be seen that by determining the proper locations of the point 15 and the pivot 16, about the latter of which the lever 12 revolves and the arm 14 rotates, the scale 20 with which the pointer end 21 of the arm 14 cooperates may then be divided into equal increments whereby a smaller scale may be employed and indications of the per cent of relative humidity more easily and more accurately indicated.

In Fig. 3 there are illustrated three positions of the lever 12 and arm 14 for 10%, 50% and 90% relative humidity, respectively, showing the unequal vertical distances through which the point 15 travels due to unequal increments of expansion of the human hairs for equal increments of change of relative humidity to produce equal angular increments of travel of the arm 14 and, hence, of the pointer end 21 thereof over the scale 20 in the manner shown graphically in Fig. 2 and described above.

Referring now to Figs. 4, 5 and 6 there is shown a practical form of instrument embodying the invention and, as illustrated, constituted by a base 22 formed, as by stamping, of some suitable material such as sheet metal, and provided with ears or lugs 23 for mounting the instrument on a wall or bracket in the region in which the relative humidity is to be indicated. Rigidly secured to the base 22, as by means of a strip 24 and screws 25, is a plate 26 which constitutes the relatively fixed support for the substantially parallel sets of human hairs 7 and 8 and for the pointer arm 14 and its associated mechanism by means of which the hairs cause movement thereof.

The set of hairs 7 is gripped at each end by means of clamps 27 and 28, respectively, while the set of hairs 8 is gripped at its ends by similar clamps 29 and 30, respectively. The clamp 27 is pivotally connected at 31 to a bracket 32 rigidly connected to the plate 26 by means of a screw 33, the bracket 32 being provided with a slot 34 for adjusting the initial tension on both sets of hairs. The clamp 28 is pivoted to one end of the equalizing bar 10 while the clamp 30 of the set of hairs 8 is pivoted to the other end of said equalizing bar. The other clamp 29 of the set of hairs 8 is pivotally connected to a link 35 which in turn is connected to the lever 12, the pivotal connection between the link 35 and the clamp 29 representing the connection 11 shown diagrammatically in Fig. 1.

The arm 14 is provided at its upper end with a bushing 36 (Fig. 5) by means of which it is journaled on the shank 37 of a screw 38, the latter passing through a bracket 39 carried by the plate 26 to form a journal support for said arm 14. A similar bracket 40 is provided at the other end of the plate 26 to provide the pivotal connection 17 for the equalizing bar 10, said pivotal connection being constituted by a screw 41 passing through the bracket 40. Thus, the sets of hairs 7 and 8 are spaced from the supporting plate 26 in order that they may be more readily acted upon by the humid air.

The scale 20 is etched or otherwise marked on a plate 42 which has secured thereto or formed integrally therewith a pair of arms 43 and 44 bent inwardly at right angles to the plate for securing the latter to the plate 26 in any suitable manner as by means of screws 45 and 46.

In order to protect the instrument from breakage and from being disturbed in any manner, a suitable cover 47 is provided having a plurality of openings 48 along the sides thereof so that air may circulate therethrough and act upon the human hairs. The cover is held to the base 22 by a pair of resilient tongues 49 and 50 provided on opposite sides of the base and which are adapted to engage corresponding grooves (not shown) on the cover 47. The cover is also provided with an opening 51 constituting a window through which the scale 20 and the pointer 21 may be viewed in order to obtain a reading of the per cent of relative humidity.

There is thus provided a novel instrument for indicating the moisture content or relative humidity in a desired region such as a room or building, and embodying a novel structure including two sets of human hairs connected for cumulative action to provide an increased effect on a pointer, said two sets being so connected to each other and to the pointer that the latter will move in equal increments for unequal increments of expansion and contraction of both sets of human hairs, thus making it possible to use an equally divided scale on which the pointer may indicate the relative humidity in equal increments of per cent.

Although only one embodiment of the invention has been illustrated and described, various changes and modifications in the form and relative arrangement of the parts, which will now appear to those skilled in the art, may be made without departing from the scope of the invention. For example, the scale 20 may be inscribed on a dial to be rotated by and upon expansion and contraction of the hygroscopic elements, and the latter may be made of other suitable hygroscopic material such as paper instead of human hairs so long as the two elements are connected together in accordance with the invention. Reference is, therefore, to be had to the appended claims for a definition of the limits of the invention.

What is claimed is:

1. A humidity indicator comprising two elongated hygroscopic elements adapted to expand and contract with changes in humidity, an equalizing bar pivotally mounted intermediate its ends, to which ends are respectively connected one of the ends of each of said elements, a relatively fixed support to which the other end of one of said elements is connected, a spring to which the other end of the other element is connected, a crank having one arm thereof connected to said other element at that end at which the spring is connected thereto and the other arm of said crank being free and constituting a pointer, and a scale cooperating with said pointer said pointer having a movement sufficient to cover a substantial portion of the humidity range.

2. A humidity indicator comprising two elongated hygroscopic elements adapted to expand and contract in unequal increments for equal increments of change in humidity, an equalizing bar pivotally mounted intermediate its ends, to which ends are respectively connected one of the ends of each of said elements, a relatively fixed support to which the other end of one of said elements is connected, a crank having one arm thereof connected to the other end of said other element and the other arm of said crank being free and constituting a pointer, a scale cooperating with said pointer, and a spring connected to said other arm for maintaining said elements under tension, said crank being eccentrically pivoted whereby the unequal increments of expansion and contraction of said elements produce equal increments of angular movement of said pointer.

3. A humidity indicator comprising a pointer, a scale cooperating with said pointer, having equally spaced divisions thereon, two hygroscopic elements adapted to expand and contract in unequal increments for equal increments of change in humidity, an equalizing device connecting said elements together at one end of each of said elements, a relatively fixed support to which the other end of one of said hygroscopic elements is connected, the other end of said other hygroscopic element being connected to said pointer through a pivotal arm, said arm extending at an acute angle to the line of movement of the other end of the other element whereby the unequal increments of expansion and contraction of said elements produce equal increments of angular movement of said pointer.

RALPH R. CHAPPELL.
ROBERT J. STREB.